July 8, 1969  L. T. LA BELLE  3,453,902
HAND BRAKE MECHANISM
Filed Aug. 16, 1967  Sheet 1 of 3

Inventor:—
Laurence T. LaBelle,
By Edward F. Jurow Atty.

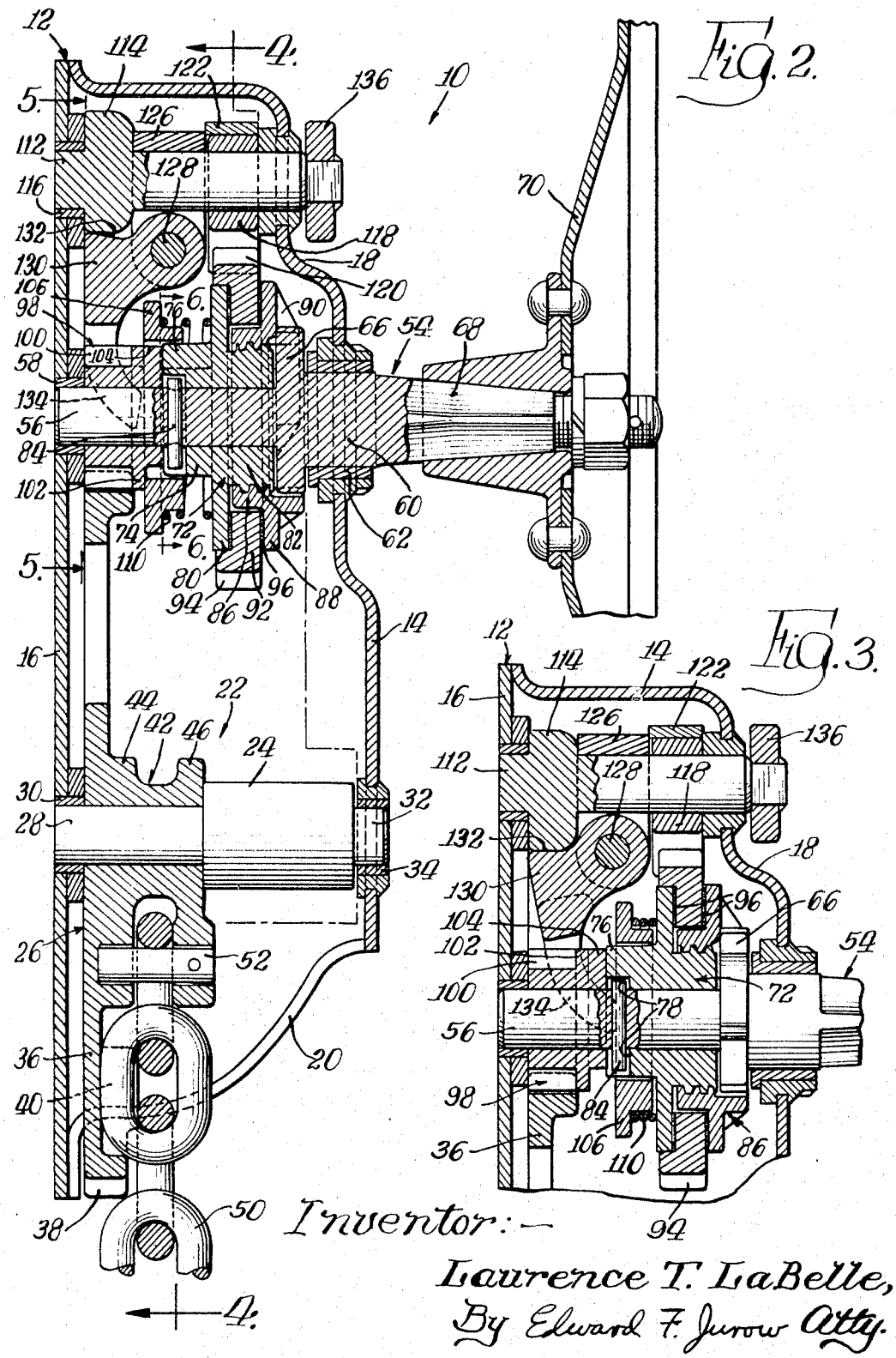

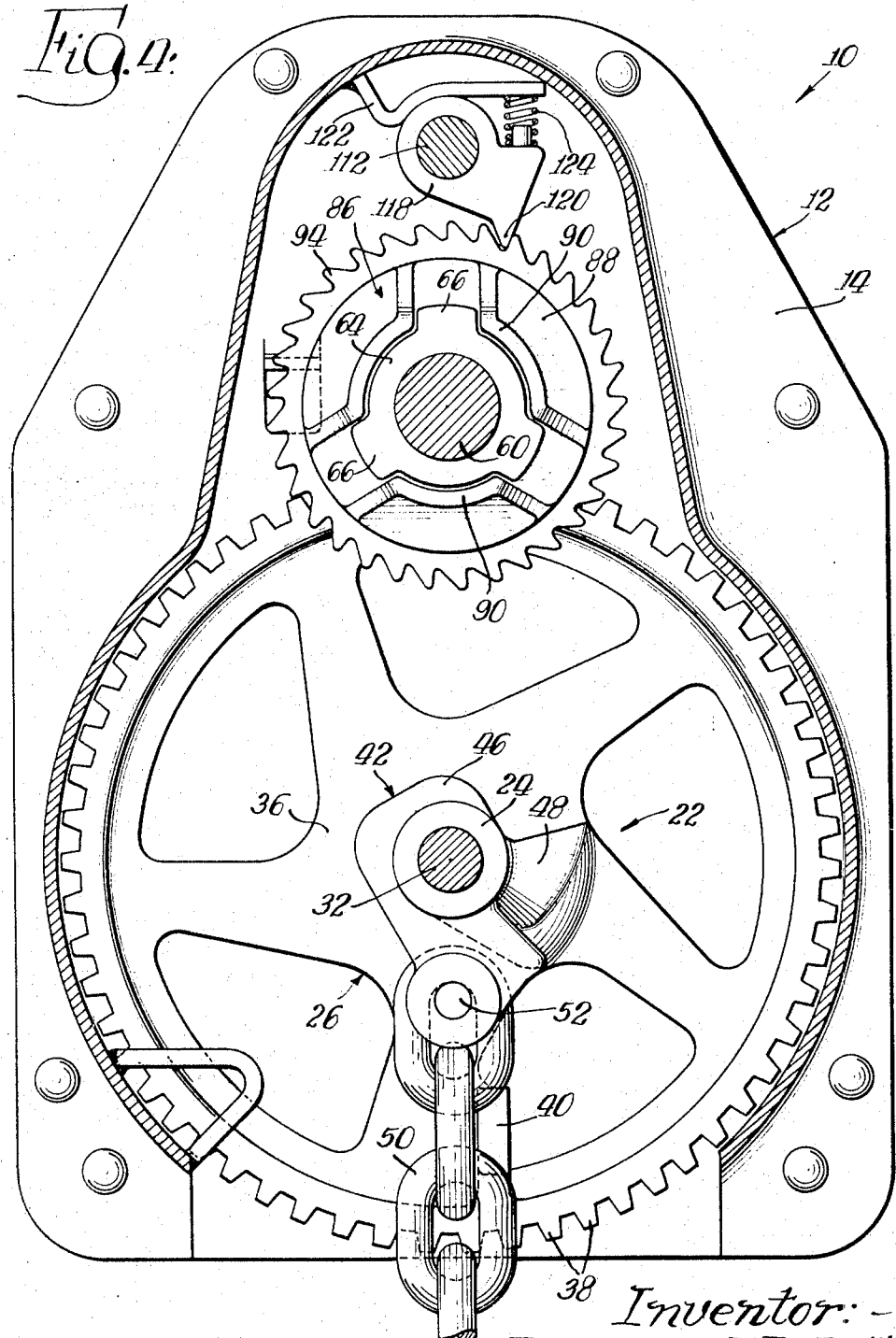

United States Patent Office
3,453,902
Patented July 8, 1969

3,453,902
HAND BRAKE MECHANISM
Laurence T. La Belle, Downers Grove, Ill., assignor to W. H. Miner, Inc., Chicago, Ill., a corporation of Delaware
Filed Aug. 16, 1967, Ser. No. 661,028
Int. Cl. G05g 1/08
U.S. Cl. 74—505    7 Claims

ABSTRACT OF THE DISCLOSURE

A hand brake mechanism having an operating spindle, a rotatable pinion coupled to a winding drum assembly, a rotatable ratchet wheel engaged by pawl means, and clutch mechanism selectively operable to clutch the pinion and the ratchet wheel to the spindle. The winding drum assembly includes a drum having a cam ramp for guiding a portion of brake chain over the drum and onto a secondary drum.

---

The present invention relates generally to hand brakes for railway cars and more particularly to the operating or control mechanism therefor.

In general, a hand brake comprises a winding drum assembly upon which brake chain may be wound to set the brakes, an operating spindle and hand wheel for operating the winding drum assembly, a pinion associated with the spindle and coupled to the winding drum assembly, and a ratchet and pawl assembly for preventing unwinding of the chain and release of the brakes.

It is an object of the present invention to provide a hand brake wherein the brakes may be controllably and slowly released without spin of the operating spindle and hand wheel. To accomplish this object, there is provided first clutch means for selectively clutching the ratchet wheel to the spindle and means connecting the pinion to the first clutch means. Rotation of the operating spindle in one direction engages the first clutch means and effects rotation of the winding drum assembly in a winding direction. During stepwise rotation of the operating spindle in the other direction, the first clutch means is alternately released and engaged to thereby permit slow unwinding of the brake chain and release of the brakes.

It is another object of the present invention to provide a hand brake, as described, wherein the brakes may be released rapidly without spin of the operating spindle and hand wheel. In this connection, second clutch means is arranged between the pinion and the first clutch means, and means are provided for disengaging the second clutch means whereupon the pinion is free to rotate relative to the spindle for quick unwinding of the brake chain from the winding drum assembly.

It is a further object of the present invention to provide a hand brake having greater chain take-up capacity than prior art devises. In this respect, there is provided a winding drum assembly comprising a shaft presenting a secondary drum portion, and a gear and drum member secured to the shaft and having a cam ramp sector for guiding a portion of the brake chain axially over the drum member and onto the secondary drum portion of the shaft during the winding operation.

Now in order to acquaint those skilled in the art with the manner of constructing and using hand brake mechanisms in accordance with the principles of the present invention, there will be described in connection with the accompanying drawings, a preferred embodiment of the invention.

In the drawings:

FIGURE 2 is an enlarged sectional view, taken substantially along the line 2—2 in FIGURE 1, looking in the direction indicated by the arrows;

FIGURE 3 is a fragmentary sectional view, corresponding to the upper portion of FIGURE 2, and illustrates the mechanism in a quick brake release position;

FIGURE 4 is a sectional view, taken substantially along the line 4—4 in FIGURE 2, looking in the direction indicated by the arrows;

Figure 1:
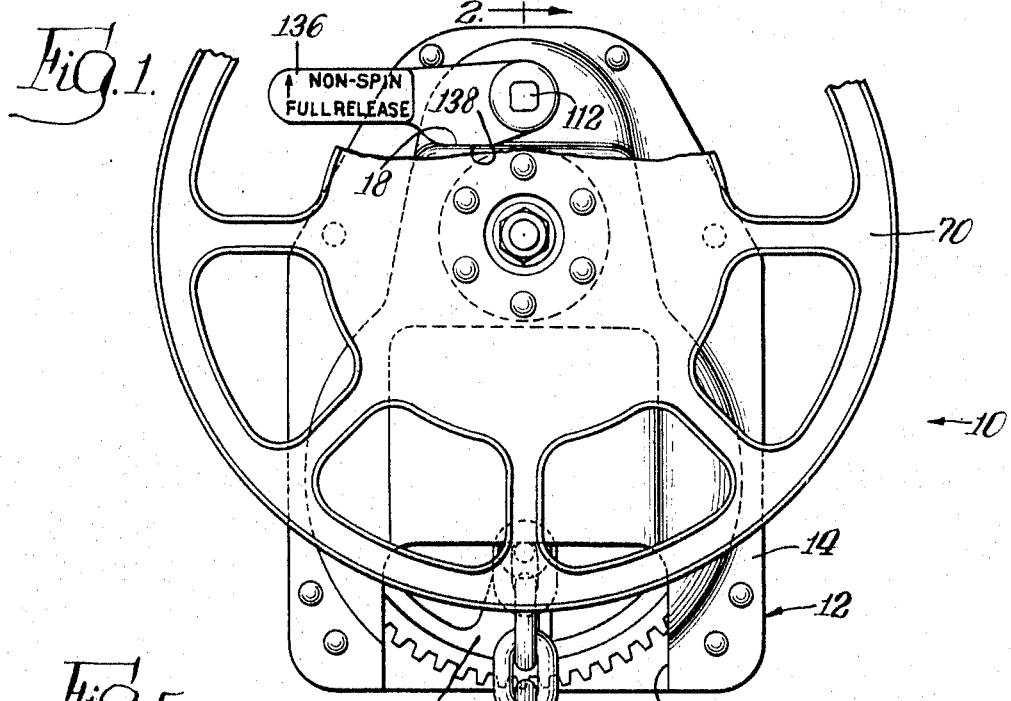
FIGURE 1 is a front elevational view of the hand brake mechanism of the present invention, with a portion of the hand wheel being broken away to better illustrate the quick release handle.

Referring now to FIGURES 1 and 2, there is indicated generally by the reference numeral 10, a hand brake mechanism which includes a housing 12 comprised of a front casing 14 suitably secured to a vertical base plate 16 adapted to be mounted to the end wall of a railway car body. The casing 14 is formed with an exterior ledge 18 adjacent its upper end, and with a cut-out or opening 20 at its lower end.

Rotatably mounted in the housing 12 adjacent the lower end thereof, as shown in FIGURES 2 and 4, is a winding gear and drum assembly 22 comprised of a horizontal shaft 24 and a gear drum member 26. The shaft 24 has a reduced rear end portion 28 journalled in a bushing 30 secured in the base plate 16 and a reduced forward end portion 32 journalled in a bushing 34 secured in the casing 14. The gear and drum member 26 includes a spur gear portion 36 provided with peripheral gear teeth 38 and an axial lug 40, and a hub or drum portion 42 secured on the shaft portion 28. The hub 42 is formed with axially spaced flange portions 44 and 46, and with a sloping cam ramp sector 48 extending axially across the face of the hub. One end of a brake chain 50 is connected to the gear and drum member 26 by means of a removable pin member 52 extending axially between the hub flanges 44 and 46. Because the pin member 52 is readily removable, the chain 50 can be connected to and unconnected from the gear and drum member 26 without dismantling other components of the brake mechanism 10 and without causing damage to the gear 36. The other end of the chain 50 is connected in the usual manner to the braking system of a railway car.

Means for controlling rotation of the gear 36 comprises a horizontal operating spindle 54 mounted in the housing 12 above the shaft 24. The spindle 54 includes a read end portion 56 journalled in a bushing 58 secured in the base plate 16, an intermediate body portion 60 journalled in a bushing 62 secured in the casing 14, a collar portion 64 immediately rearwardly of the body portion 60 and having radial ear or tooth portions 66, and a tapered forward end portion 68 on which a hand wheel assembly 70 is suitably secured.

Figure 6:
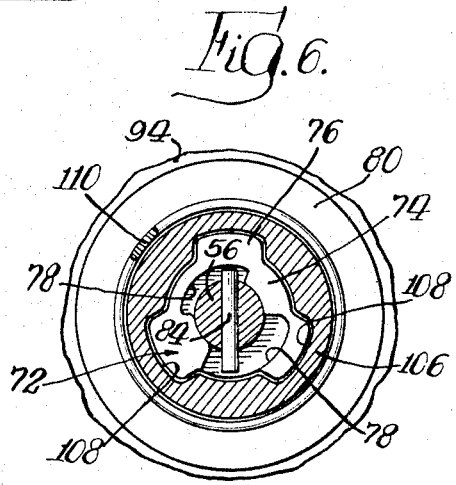
FIGURE 6 is a sectional view, taken substantially along the line 6—6 in FIGURE 2, looking in the direction indicated by the arrows.

Mounted on the spindle portion 56 adjacent the collar 64, as shown in FIGURES 2 and 6, is a lock ring clutch 72 having a rear end portion 74 with radial ear or tooth portions 76 and interior arcuate recesses 78, an intermediate flange portion 80, and a forward threaded portion 82. A pin member 84 is disposed transversely through the spindle portion 56 with the end portions thereof projecting into the arcuate recesses 78 to provide a lost motion connection therebetween. Mounted on the threaded portion 82 is an interiorly threaded lock ring 86 having a flange portion 88 with axially directed ridges 90 that are shaped, as shown in FIGURE 4, to conformably mate with the operating spindle collar 64 and ear portions 66 thereof whereby to provide a connection between the operating spindle 54 and the lock ring 86. Arranged concentrically of the spindle 54 intermediate of the lock ring clutch flange 80 and the lock ring flange 88 (FIGURE 2) is the flange portion 92 of a ratchet wheel 94; and interposed between the adjacent faces of the flanges 80, 92 and 88, 92 are friction discs 96. The ratchet wheel 94 is adapted to be clutched to the spindle 54 upon relative rotation between the spindle 54 and the lock ring clutch 72 in one direction.

Figure 5:
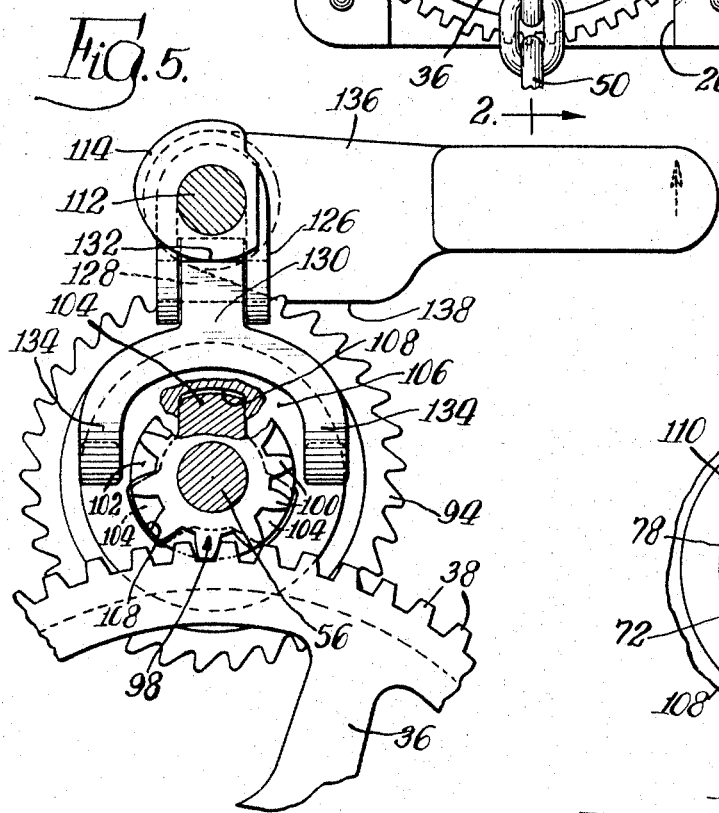
FIGURE 5 is a sectional view, taken substantially along the line 5—5 in FIGURE 2, looking in the direction indicated by the arrows.

Mounted on the spindle portion 56 rearwardly of the lock ring clutch 72, as shown in FIGURES 2 and 5, is a pinion 98 having gear pinion teeth 100 engaged or coupled with the gear teeth 38 of the spur gear 36, an intermediate shoulder section 102, and forward axially projected radial ear or tooth portions 104. Slidably mounted on or keyed to the rear end portion 74 of the lock ring clutch 72 (FIGURE 2) is an axially shiftable release plate or jaw clutch member 106 having interior grooves 108 adapted to conformably mate with the lock ring clutch ears 76 (FIGURE 6) and the pinion ears 104 (FIGURE 5). A coil spring 110 is interposed between the lock ring clutch flange 80 and the jaw clutch 106 for normally biasing the latter to the position shown in FIGURE 2 against the pinion clutch shoulder section 102. The lock ring clutch 72 and lock ring 86 serve as first clutch means for selectively clutching the ratchet wheel 94 to the operating spindle 54; the jaw clutch member 106 serves as second clutch means for selectively clutching the pinion 98 to the first clutch means; and the first and second clutch means together serve as clutch mechanism which is selectively operable to clutch the pinion 98 and the ratchet wheel 94 to the operating spindle 54 whereby to control rotation of the gear and drum assembly 22 as will be explained more fully hereinafter.

Arranged in the housing 12 above the operating spindle 54 is a secondary spindle 112 formed with an integral release cam portion 114. The spindle 112 is journalled, at its rear end, in a bushing 116 secured in the base plate 16, and, at its forward end, in the casing 14. Pivotally mounted on the spindle 112 is a pawl 118 having a tooth portion 120. Overlying the pawl 118 is a strap member 122 which, as shown in FIGURE 4, is secured at one end to the casing 14. Interposed between the strap member 122 and the pawl 118 is a coil spring 124 which serves to bias the pawl tooth 120 into engagement with the ratchet wheel 94. Suspended from the secondary spindle 112 intermediate of the release cam 114 and the pawl 118, as shown in FIGURES 2 and 5, is an inverted U-shaped hanger 126 across the lower ends of which extends a pin member 128. Pivotally supported on the pin member 128 is a release fork 130 having an upper flat 132 engageable by the cam 114 and depending arms 134 engageable at their ends with the jaw clutch 106. A release lever 136 is secured to the forward end of the secondary spindle 112, and is provided with a lower flat 138 which, as shown in FIGURE 1, normally engages the casing ledge 18. If desired, the release lever 136 may be extended angularly downwardly along the side of the housing 12 to accommodate lower level operation thereof.

When the parts occupy the several positions shown in FIGURES 1 and 2, the mechanism is conditioned for winding to set the brakes. To effect brake setting, the hand wheel 70 is rotated clockwise, as viewed in FIGURE 1, and the operating spindle 54 and the lock ring 86 are thereby correspondingly rotated. Initially, the lock ring 86 is moved to the left, as viewed in FIGURE 2, by reason of the threaded interconnection with the lock ring clutch 72, and the ratchet wheel 94 is clutched or clamped between the lock ring 86 and the lock ring clutch 72. Thereafter, the ratchet wheel 94, the lock ring clutch 72, the jaw clutch 106, and the pinion 98 are caused to rotate with the operating spindle 54.

Upon clockwise rotation of the pinion 98, the gear 36 is rotated counterclockwise, as viewed in FIGURE 4, and the chain 50 is wound around the drum 42 to set the brakes. The lug 40 serves to prevent winding of the chain in the wrong direction. The drum 42 offers sufficient capacity for normal chain take-up required in most applications. However, to accommodate greater chain take-up in special application, the cam ramp 48 serves to guide a portion of the chain axially over the drum 42 and onto the main body portion of the shaft 24 which serves as a secondary drum. The diameter of the main body or drum portion of the shaft 24 is selected to provide uniform power during full chain take-up. During the winding operation, the pawl 118 rides over the teeth of the ratchet wheel 94 and prevents unwinding of the chain 50 while the brakeman shifts his grip on the hand wheel 70.

To release the brakes slowly, the hand wheel 70 is rotated a short distance counterclockwise, as viewed in FIGURE 1. The operating spindle 54 and the locking ring 86 are thereby correspondingly rotated, and the locking ring 86 is moved to the right, as viewed in FIGURE 2, by reason of the threaded interconnection with the lock ring clutch 72. The locking ring 86 is thus backed off of the ratchet wheel 94 whereupon the latter is momentarily unclutched and the lock ring clutch 72 is released for limited rotation to permit limited unwinding of the chain 50. As the lock ring clutch 72 rotates and catches up with the locking ring 86, the locking ring 86 is returned to the left on the threads of the lock ring clutch 72, and the ratchet wheel 94 is again clutched or clamped between the lock ring 86 and the lock ring clutch 72 to stop unwinding. When the hand wheel 70 is rotated another short distance counterclockwise, the foregoing procedure is repeated. By successively rotating the hand wheel 70 counterclockwise in incremental steps, the brakes may be slowly released, without spin of the hand wheel, until the point of full release is reached. During controlled release of the brakes, the pin member 84 prevents the operating spindle 54 from unwinding to the right against the housing in the event the pinion 98 and gear 36 become jammed.

To release the brakes quickly, the handle 136 is swung upwardly from the position shown in FIGURES 1 and 5 for rotating the secondary spindle 112. In this manner, the high point of the cam 114 is rotated toward the flat 132 of the release fork 130 and the latter is pivoted counterclockwise from the position shown in FIGURE 2 to the position shown in FIGURE 3. The jaw clutch member 106 is thus moved to the right and disengaged from the pinion 98 whereupon the latter is released to permit quick without spin of the operating spindle 54 and hand wheel 70.

The mechanism may be restored to brake setting condition by returning the handle 136 to the position shown in FIGURE 1 with the flat 138 thereof in engagement with the casing ledge 18. During return movement of the handle 136, the secondary spindle 112 is rotated and the high point of the cam 114 is moved away from the release fork 130. At the same time, the spring 110 returns the jaw clutch member 106 and the release fork 130 to the position shown in FIGURE 2. Slight rotation of the hand wheel 70 may be necessary to secure engagement of the pinion tooth portions 104 with the jaw clutch grooves 108.

With the above-described hand brake mechanism of the present invention, it will be appreciated that the braking load may be held at any point, that the braking load may be optionally released either gradually or rapidly, that backspin of the operating spindle and hand wheel is completely eliminated, and that the operating spindle may be readily and inexpensively fabricated because of the absence of threaded portions intermediate of the ends thereof. Moreover, by reason of the provision of a secondary drum, longer chain take-up is accommodated.

While there has been shown and described a preferred embodiment of the present invention, it will be understood by those skilled the art that various rearrangements and modifications may be made therein without departing from the spirit and scope of the invention.

I claim:

1. In a hand brake mechanism having a housing, the combination of an operating spindle rotatably mounted in the housing, a pinion rotatably mounted on said spindle, a winding drum assembly rotatably mounted in the housing and coupled to said pinion, a ratchet wheel rotatably mounted concentric of said spindle, pawl means mounted in the housing and having engagement with said ratchet wheel, and first and second clutch means operable respectively for selectively clutching said ratchet wheel to said spindle and for selectively clutching said pinion to said first clutch means, whereby to control rotation of said winding drum; said first clutch means comprising a lock ring clutch mounted on said spindle and having a friction clutch face and a threaded portion, and a lock ring threaded on said lock ring clutch threaded portion and connected to said spindle and having a friction clutch face; and wherein said ratchet wheel is mounted between said friction clutch faces of said lock ring clutch and said lock ring, and is clutched to said spindle upon relative rotation between said spindle and said lock ring clutch in one direction.

2. The combination of claim 1 wherein said second clutch means comprises an axially shiftable jaw clutch keyed to said lock ring clutch and being selectively engageable with said pinion; and including means for moving said jaw clutch axially to disengage the latter from said pinion to permit quick unwinding of said winding drum without spin of said operating spindle.

3. The combination of claim 2 including a lost motion connection between said spindle and said lock ring clutch, said lost motion connection comprising interior recesses formed in said lock ring clutch, and a pin member disposed transversely through said spindle with the end portions thereof projecting into said lock ring clutch recesses.

4. The combination of claim 2 wherein said moving means for said jaw clutch comprises a secondary spindle rotatably mounted in the housing above said operating spindle and having a cam portion thereon, a release fork pivotally supported from said secondary spindle and being engageable by said cam portion, and said release fork having depending arms engageable with said jaw clutch for disengaging latter from said pinion upon rotation of said secondary spindle and said cam portion thereon.

5. The combination of claim 4 wherein said pawl means comprises a pawl rotatably mounted on said secondary spindle and having a pawl tooth, and means mounted in the housing and engaging said pawl for biasing said pawl tooth into engagement with said ratchet wheel.

6. The combination of claim 1 wherein said winding drum assembly comprises a shaft rotatably mounted in the housing and presenting a cylindrical secondary drum portion, a gear and drum member secured to said shaft and including a gear meshing with said pinion and a drum upon which brake chain may be wound, and said drum having a cam ramp sector extending axially across the face thereof for guiding a portion of the brake chain axially over said drum and onto said cylindrical secondary drum portion of said shaft.

7. In a hand brake mechanism having a housing and an operating spindle rotatably mounted in the housing, the improvement which comprises a shaft rotatably mounted in the housing and presenting a cylindrical secondary drum portion, a gear and drum member secured to said shaft and including a gear adapted to be coupled to the operating spindle and a drum upon which brake chain may be wound, and said drum having a cam ramp sector extending axially across the face thereof for guiding a portion of the brake chain axially over said drum and onto said cylindrical secondary drum portion of said shaft.

References Cited

UNITED STATES PATENTS

| | | | |
|---|---|---|---|
| 1,877,308 | 9/1932 | Harris | 74—505 |
| 3,040,597 | 6/1962 | Bretz | 74—505 |
| 3,176,539 | 4/1965 | Mersereau | 74—505 |
| 3,258,991 | 5/1966 | Bezlaj | 74—505 |

MILTON KAUFMAN, Primary Examiner.

U.S. Cl. X.R.

254—167